US008234223B1

(12) United States Patent
Maginniss

(10) Patent No.: US 8,234,223 B1
(45) Date of Patent: Jul. 31, 2012

(54) METHOD AND SYSTEM FOR CALCULATING COST OF AN ASSET USING A DATA MODEL

(75) Inventor: Eric Maginniss, Round Rock, TX (US)

(73) Assignee: Troux Technologies, Inc., Austin, TX (US)

( * ) Notice: Subject to any disclaimer, the term of this patent is extended or adjusted under 35 U.S.C. 154(b) by 1516 days.

(21) Appl. No.: 11/117,039

(22) Filed: Apr. 28, 2005

(51) Int. Cl.
*G06F 17/00* (2006.01)
*G06G 7/00* (2006.01)
*G06Q 10/00* (2012.01)
*G06Q 30/00* (2012.01)

(52) U.S. Cl. ...................................... 705/400; 705/7.35
(58) Field of Classification Search .................. 705/400, 705/7.35; 700/107
See application file for complete search history.

(56) References Cited

U.S. PATENT DOCUMENTS

| | | | |
|---|---|---|---|
| 5,572,732 A | 11/1996 | Fant et al. | |
| 5,845,068 A | 12/1998 | Winiger | |
| 5,968,176 A | 10/1999 | Nessett et al. | |
| 6,226,792 B1 | 5/2001 | Goiffon | |
| 6,292,900 B1 | 9/2001 | Ngo et al. | |
| 6,442,557 B1 | 8/2002 | Buteau et al. | |
| 6,509,898 B2 | 1/2003 | Chi | |
| 6,529,909 B1 | 3/2003 | Bowman-Amuah | |
| 6,611,838 B1 | 8/2003 | Ignat et al. | |
| 6,662,188 B1 | 12/2003 | Rasmussen et al. | |
| 7,080,077 B2 | 7/2006 | Ramamurthy et al. | |
| 7,103,171 B1 | 9/2006 | Annadata et al. | |
| 7,124,180 B1 | 10/2006 | Ranous | |
| 7,231,661 B1 | 6/2007 | Villavicencio et al. | |
| 7,409,707 B2 | 8/2008 | Swander et al. | |
| 7,428,546 B2 | 9/2008 | Nori et al. | |
| 7,480,798 B2 | 1/2009 | Haugh | |
| 7,512,965 B1 | 3/2009 | Amdur et al. | |
| 7,523,128 B1 | 4/2009 | Miller et al. | |
| 7,533,173 B2 | 5/2009 | Badovinatz et al. | |
| 7,558,790 B1 | 7/2009 | Miller et al. | |
| 7,603,547 B2 | 10/2009 | Patrick et al. | |
| 7,644,432 B2 | 1/2010 | Patrick et al. | |
| 7,664,712 B1 | 2/2010 | Duvall et al. | |
| 7,669,051 B2 | 2/2010 | Redlich et al. | |
| 7,698,683 B1 | 4/2010 | Miller | |
| 7,757,277 B2 | 7/2010 | Haugh | |
| 7,822,710 B1 | 10/2010 | Miller et al. | |
| 7,890,545 B1 | 2/2011 | Cason, Jr. et al. | |

(Continued)

OTHER PUBLICATIONS

"E-manufacturing e'zing into factories: the potential is great for using the Internet to aid Manufacturing. Supply chain visibility, the wired plant, trading exchanges and data sharing are at the forefront."; Maloney, David; Moder Material Handling, v 57, n6, p. 21 (3) May 15, 2002 from Dialog.*

(Continued)

*Primary Examiner* — John Hayes
*Assistant Examiner* — David J Clark
(74) *Attorney, Agent, or Firm* — Sprinkle IP Law Group

(57) ABSTRACT

Systems and methods for calculating dependencies and costs of assets which take into account the costs of the infrastructure and resources needed to support that asset are disclosed. A data model of an arbitrary system may be used to create a dependency map for one or more of the components within the data model, taking into account the dependency chain of the component. Utilizing the costs of various components in this dependency chain, the cost of the original component may then be calculated.

21 Claims, 11 Drawing Sheets

U.S. PATENT DOCUMENTS

| | | | |
|---|---|---|---|
| 8,027,956 | B1 | 9/2011 | Van Riper et al. |
| 8,086,615 | B2 | 12/2011 | Patrick et al. |
| 2003/0009487 | A1 | 1/2003 | Prabakaran et al. |
| 2003/0008851 | A1 | 5/2003 | Tong |
| 2003/0110253 | A1 | 6/2003 | Anuszczyk et al. |
| 2003/0177481 | A1 | 9/2003 | Amaru et al. |
| 2003/0187826 | A1 | 10/2003 | Kennedy et al. |
| 2003/0208367 | A1 | 11/2003 | Aizenbud-Reshef |
| 2003/0212640 | A1 | 11/2003 | Andresen |
| 2004/0002818 | A1 | 1/2004 | Kulp |
| 2004/0049509 | A1* | 3/2004 | Keller et al. ............ 707/100 |
| 2004/0059943 | A1 | 3/2004 | Marquet et al. |
| 2004/0073655 | A1 | 4/2004 | Kan |
| 2004/0111513 | A1 | 6/2004 | Shen |
| 2004/0225791 | A1 | 11/2004 | Keskar |
| 2004/0243835 | A1 | 12/2004 | Terzis et al. |
| 2004/0260706 | A1 | 12/2004 | Anonsen et al. |
| 2005/0033762 | A1 | 2/2005 | Kasravi |
| 2005/0138039 | A1 | 6/2005 | Hagen |
| 2005/0203920 | A1* | 9/2005 | Deng et al. ............ 707/100 |
| 2006/0085837 | A1 | 4/2006 | Pesati et al. |
| 2006/0106796 | A1 | 5/2006 | Venkataraman et al. |
| 2006/0136437 | A1 | 6/2006 | Yamasaki |
| 2006/0167927 | A1 | 7/2006 | Edelstein |
| 2006/0195460 | A1 | 8/2006 | Nori |
| 2006/0195575 | A1 | 8/2006 | Delany et al. |
| 2006/0212487 | A1 | 9/2006 | Kennis et al. |
| 2006/0253709 | A1 | 11/2006 | Cheng et al. |
| 2006/0277022 | A1* | 12/2006 | Pulfer ............... 703/22 |
| 2006/0294148 | A1 | 12/2006 | Brunet |
| 2007/0143604 | A1 | 6/2007 | Arroyo et al. |
| 2007/0180490 | A1 | 8/2007 | Renzi et al. |
| 2007/0192415 | A1 | 8/2007 | Pak |
| 2007/0255841 | A1 | 11/2007 | Chong |
| 2007/0282916 | A1 | 12/2007 | Albahari et al. |
| 2008/0120362 | A1 | 5/2008 | Kapoor et al. |
| 2010/0169380 | A1 | 7/2010 | Miller et al. |

OTHER PUBLICATIONS

Muller, Robert, "Database Design for Smarties Using UML for Data Modeling", Morgan Kaufmann Publishers, 265 pages, 1999.

Gomik, "UML Data Modeling Profile", 2002, Rational corp., TP162, pp. i-ii, 1-11.

Cbop et al., "A UML Profile Enterprise Distributed Object Computing—Joint Final Submission—Component Collaboration Archicatures (CCA)", OMG Document No. ad/2001-08-19, http://enterprisecomponent.com/docs/EdocCCA.pdf, 169 pages.

Office Action mailed Mar. 1, 2010 in U.S. Appl. No. 11/095,323, 24 pages.

Office Action mailed Mar. 16, 2010 in U.S. Appl. No. 11/805,873, 13 pages.

Office Action for U.S. Appl. No. 11/805,002, mailed Feb. 2, 2011, 12 pgs.

Notice of Allowance issued in U.S. Appl. No. 11/929,157, mailed May 23, 2011, 17 pages.

Office Action issued U.S. Appl. No. 11/929,157, mailed Jun. 16, 2010, 13 pages.

Office Action for U.S. Appl. No. 11/805,002, mailed Jul. 20, 2011, 18 pgs.

Notice of Allowance for U.S. Appl. No. 11/805,873, mailed Aug. 31, 2010, 6 pgs.

Office Action issued U.S. Appl. No. 11/929,157, mailed Nov. 24, 2010, 12 pages.

Du et al., "XML structures for relational data," Web Info. Sys. Engineering, 2001. Proceedings of the Second Int'l Conf. on (0-7965-1393-X), Dec. 3-6, 2001, vol. 1; p. 151-160, downloaded: http://ieeexplore.ieee.org/stamp/stamp.jsp?isnumber+21506&arnumber=996476&punumber=7824.

Notice of Allowance for U.S. Appl. No. 11/805,002, mailed Mar. 2, 2012, 16 pgs.

\* cited by examiner

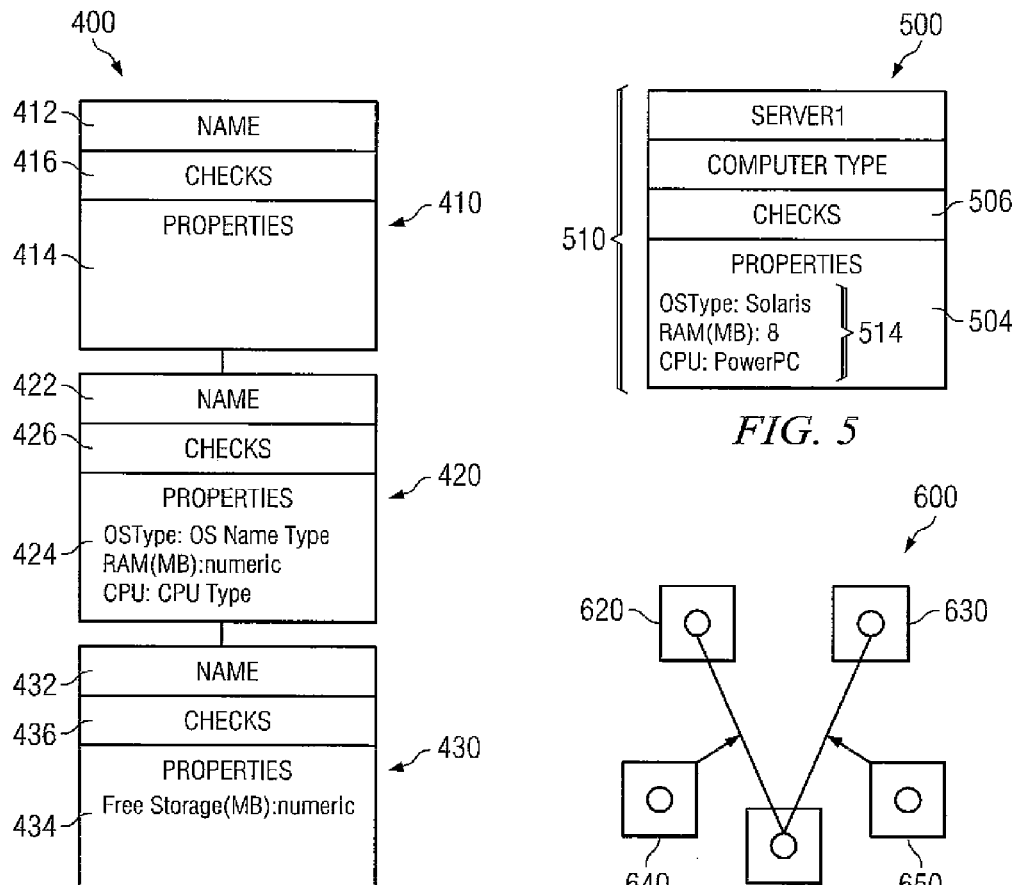
FIG. 4
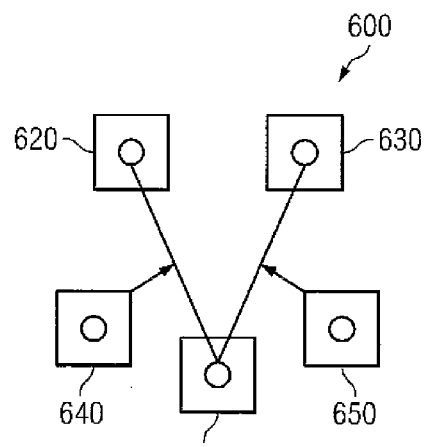
FIG. 5
FIG. 6
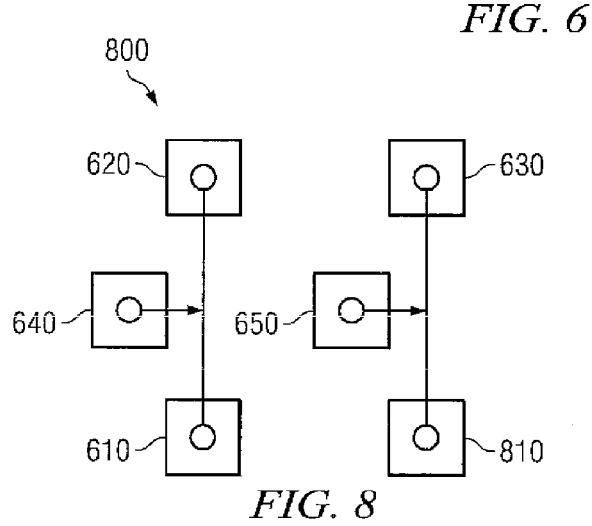
FIG. 8

| Component | First Level Dependencies |
|---|---|
| Component 910 | Component 930 |
| | Component 940 |

Table 1110

| Component | First Level Dependencies |
|---|---|
| Component 920 | Component 940 |
| | Component 950 |

Table 1120

| Component | First Level Dependencies |
|---|---|
| Component 930 | Component 960 |
| | |

Table 1130

| Component | First Level Dependencies |
|---|---|
| Component 940 | Component 950 |
| | |

Table 1140

| Component | First Level Dependencies |
|---|---|
| Component 950 | Component 960 |
| | |

Table 1150

| Component | First Level Dependencies |
|---|---|
| Component 960 | Component 990 |
| | |

Table 1160

| Component | First Level Dependencies |
|---|---|
| Component 970 | Component 990 |
| | |

Table 1170

| Component | First Level Dependencies |
|---|---|
| Component 980 | Component 990 |
| | |

Table 1180

| Component | First Level Dependencies |
|---|---|
| Component 990 | |
| | |

Table 1190

*FIG. 11*

| Dependency Chains And Percentages for Cost Calculation of Component 910 | |
|---|---|
| Dependency Chain | Percentage of Cost to Be Apportioned |
| Component 910==>Component 930 | 100% |
| Component 910==>Component 940 | 50% |
| Component 910==>Component 930==>Component 960 | 100%X100%=100% |
| Component 910==>Component 940==>Component 970 | 50%X100%=50% |
| Component 910==>Component 930==>Component 960==>Component 990 | 100%X100%X33%=33% |
| Component 910==>Component 940==>Component 970==>Component 990 | 50%X100%X33%=16.5% |

| Cost Model | | |
|---|---|---|
| Asset | Represented By | Cost (in Dollars) |
| SAP Database | Component 910 | 100,000 |
| Server | Component 960 | 50,000 |
| Server | Component 970 | 75,000 |
| Server | Component 980 | 450,000 |
| Application Server | Component 950 | 600,000 |
| Application Server | Component 930 | 300,000 |
| Application Server | Component 940 | 250,000 |
| Data Center | Component 990 | 500,000 |
| PeopleSoft Database | Component 920 | 1,000,000 |

*FIG. 15*

| Calculation of Cost of Dependencies to Contribute to Cost of Asset Represented By Component 910 |||||
|---|---|---|---|---|
| Dependency Chain | Corresponding Asset Chain | Percentage to Be Apportioned | Cost Calculation | Cost to Attribute |
| Component 910 ==> Component 930 | SAP Database ==> Application Server | 100% | 100%X300,000 | 300,000 |
| Component 910 ==> Component 940 | SAP Database ==> Application Server | 50% | 50%X250,000 | 125,000 |
| Component 910 ==> Component 930 ==> Component 960 | SAP Database ==> Application Server ==> Server | 100%X100%=100% | 100%X50,000 | 50,000 |
| Component 910 ==> Component 940 ==> Component 970 | SAP Database ==> Application Server ==> Server | 50%X100%=50% | 50%X75,000 | 37,500 |
| Component 910 ==> Component 930 ==> Component 960 ==> Component 990 | SAP Database ==> Application Server ==> Server ==> Data Center | 100%X100%X33%=33% | 33%X500,000 | 165,000 |
| Component 910 ==> Component 940 ==> Component 970 ==> Component 990 | SAP Database ==> Application Server ==> Server ==> Data Center | 50%X100%X33%=16.5% | 16.5%X500,000 | 82,500 |
| | | | | Total= 760,000 |

Total Cost of Asset Represented by Component 910 = Cost of Asset Represented by Component 910 + Total Cost to Contribute From Dependencies = 100,000 + 760,000 = 860,000

*FIG. 16*

METHOD AND SYSTEM FOR CALCULATING COST OF AN ASSET USING A DATA MODEL

TECHNICAL FIELD OF THE INVENTION

The invention relates in general to data modeling, and more particularly, to calculating the cost of an asset using a data model.

BACKGROUND OF THE INVENTION

The world is comprised of a wide and varied assortment of environments and subsystems. Akin to the proverbial butterfly flapping its wings in China and causing a hurricane over Texas, miniscule changes to one part of an environment may have catastrophic ripple effects in a distant part of the same environment. To anticipate these effects, it is helpful to study the ramifications of a change before it occurs, and to study these ramifications it is useful to create a model of the environment. This model can then be used to discover the consequences of a change, and the combinatorial effects of multiple alterations to the environment. Additional benefits of such a model are rationalization of the technology portfolio, and assessment and management of various regulatory and business continuity risks.

However, because of the varied nature of their composition, many types of environments do not lend themselves to modeling. A microcosm of this problem occurs in many enterprise architectures. These enterprise architectures may be intended to have a wide variety of uses: disseminating information about goods and services offered through a site on the World Wide Web, achieving objectives related to a business concern, providing a programming infrastructure for development of software, or keeping track of sales and sales force information.

Consequently, these enterprise architectures grow organically, sewn together in a Frankenstinian manner from a variety of heterogeneous machines and applications. Predicting the effects of business initiatives process and organization, the interaction of application, infrastructure and data organization within an IT environment etc. on these enterprise architecture is almost an exercise in futility without some sort of model. However, modeling these types of enterprise architectures is a daunting prospect.

Typically, there are two approaches to creating models for these enterprise architectures. The first is to create a diagram or a spreadsheet based inventory of the items of interest. This approach is problematic, creating these models requires an in depth evaluation of an enterprise architecture and manual creation of the documents, and whole document retention systems must be kept in place to version and store the documents associated with these types of models. Additionally, changes to the enterprise architecture wreak havoc on these models. The effects from these changes must be manually traced through each of the diagrams, which are not only particularly prone to errors, but time consuming as well. Other problems with storing these models in documents include that there may be a large number of users who need to be able to access and modify these documents, and documents of this type don't lend themselves to concurrent modification, and that it is very difficult to cross-reference information across these documents.

The second approach, equally problematic, is to store items of interest within an enterprise architecture in a relational database. Models created with these relational database tables, however, are particularly susceptible to changes in the enterprise architecture itself. Adding layers, applications, dependencies, projects, geographical locations etc. to an enterprise architecture may require changes to the table schema implementing the model, which may in turn may entail revising all the SQL statements used to implement the database.

A microcosm of these problems occurs with respect to calculating the cost of various assets in these enterprise environments. The cost of an asset within an enterprise architecture may go beyond the direct cost of purchasing and maintaining that asset. In many cases, the true cost of an asset depends on the cost of the infrastructure and other resources needed to actually support or implement that asset. In other words, the total cost of a single asset may include the cost of portions of other assets, and the cost of these other assets may depend on still other assets. Consequently, the actual cost of an asset may encompass both direct and indirect costs.

Typically, solutions to calculating the cost of a component do not take into account these multiple direct, and indirect, dependencies. Prior solutions to calculating the cost of an asset utilized standard financial tools, such as spread sheets or other tabular recording or calculating means. These solutions are incapable of accounting for the complex interdependencies between assets of a large enterprise architecture. Additionally, these solutions are limited to a single-level dependency and could not aggregate the cost of multiple levels of dependencies.

As can be seen, a need exists for methods and systems for a data model which can model an arbitrarily complex enterprise architecture, and which is easily extensible to allow the representation of any desired logical or physical entity and the associations and dependencies between these entities. Furthermore, a need exists for methods and systems which can use these data models to accurately calculate the cost of an asset within the modeled enterprise architecture.

SUMMARY OF THE INVENTION

Systems and methods for calculating dependencies and costs of assets in an enterprise architecture which take into account the costs of the infrastructure and resources needed to support that asset are disclosed. These systems and methods may utilize a reference model composed of a logically structured taxonomy of component types, relationship types and property types with which to create a data model. An enterprise architecture may then be modeled utilizing component types, components, relationship types, relationships and properties based on this reference data model. The data model of the enterprise architecture may then be used to create a dependency map for one or more of the components within the data model, taking into account the dependency chain of the component. Utilizing the costs of various components in this dependency chain, the cost of the original component may be calculated. Though various simple example environments will be used to demonstrate the power and flexibility of these systems and methods, after reading this disclosure it will be apparent to those of ordinary skill in the art that theses types of systems and methods for calculating the cost of components may be utilized with any arbitrarily complex enterprise architecture, and for that matter any arbitrarily complex real world system.

In one embodiment, a set of dependency chains for a component representing an asset in a data model is determined, a percentage of a cost of a last component in each dependency chain associated with the component is determined and the cost of the asset based on the percentage and the cost for the last component of each dependency chain is calculated.

In another embodiment, each dependency chain has a first set of relationships and a set of components in the data model, and the dependency chains has a first component and a last component and relationships indicated dependencies between components in a dependency chain.

Embodiments of the present invention provide the technical advantage that the calculation of a cost of a component can be calculated taking into account not only the direct cost of that asset, but in addition, the costs of the other assets both real and virtual on which the asset depends. Furthermore, the present invention can take into account cyclical dependencies within a dependency chain of an asset.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 4 includes a representation of a hierarchy of component types.

FIG. 5 includes a representation of a component instantiated from a component type.

FIG. 6 includes a representation of an application of a data model to the IT environment of FIG. 1.

FIG. 8 includes a representation of an application of a data model to the IT environment of FIG. 7.

FIG. 11 includes a representation of one embodiment of tables representing first degree dependencies of the components of the data model of FIG. 9.

FIG. 13 includes a representation of a set of dependency chains and associated cost percentages.

FIG. 15 includes a representation of a cost model.

FIG. 16 includes a representation of a cost calculation.

DETAILED DESCRIPTION

Figure 1:
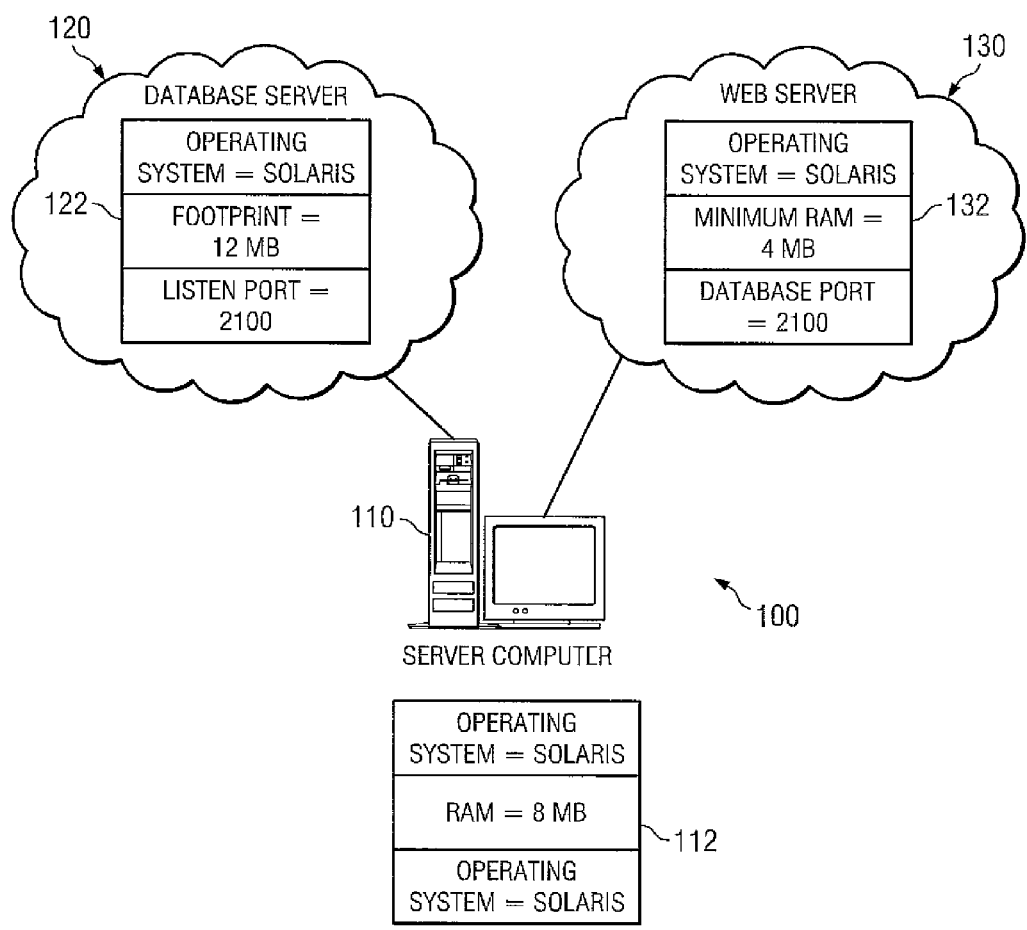
FIG. 1 includes an illustration of a simple IT environment.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. Skilled artisans should understand, however, that the detailed description and the specific examples, while disclosing preferred embodiments of the invention, are given by way of illustration only and not by way of limitation. Various substitutions, modifications, additions or rearrangements within the scope of the underlying inventive concept(s) will become apparent to those skilled in the art after reading this disclosure.

Reference is now made in detail to the exemplary embodiments of the invention, examples of which are illustrated in the accompanying drawings. Wherever possible, the same reference numbers will be used throughout the drawings to refer to the same or like parts (elements).

A few terms are defined or clarified to aid in an understanding of the terms as used throughout the specification. The term "component" is intended to mean a representation of any definable, logical or physical entity or asset. A component may have a group of properties. In an IT environment, an entity or asset may be any portion of the environment desired to be represented, including hardware, such as a server or database, applications which may reside on one or more actual machines, virtual data repositories, firmware and the like. Many levels of abstraction are possible. For example, a network may be represented as a component, a subnetwork of that network may be represented as a component, a server on the subnetwork may also be represented as a component, an application running across that server and other servers may also be represented as a component, a table within that application may be represented as a component, etc.

The term "relationship" is intended to mean a representation of an association or dependency between two or more components. This association may be based on the property values of the components.

The term "set", when used as in "a set of" is intended to mean a collection of one or more elements.

The term "check" is intended to mean a determination whether a relationship is valid, or a determination regarding the value or validity of a property of a component. Checks may be associated with components or relationships. In some cases a check is a piece of software which may be associated with a relationship or component. A check may have an output event, such as an email or notification.

The term "property" is intended to mean a characteristic associated with a component or a relationship. This property may have a name and a value associated with it, and components of the same type may have different values for the same property.

The term "type" is intended to mean a category of a relationship or a component. All relationships or components of the same type will have the same properties, though each instance of a component or a relationship may have different values for those properties. For example, a component type named "ComputerType" may be defined, having the properties of "RAM" and "OSType". Each instance of component type "ComputerType" will have the properties "RAM" and "OSType", however in one instance the value of "RAM" may be 4 megabytes, while in another instance the value of "RAM" may be 8 megabytes.

The term "data model" is intended to mean a model for representing anything in the physical world, coupled with logic pertaining to that representation.

The term "reference model" is a structure or taxonomy of component types, relationship types, the cardinality constraints of those relationships or property types for use in modeling a particular environment to which the reference data model pertains.

The term "cost" when used in reference to a component and a data model is intended to mean the cost of an asset associated with the component.

The term "subtype" is intended to mean a specialization of a particular type of component or relationship. For example, a component type "computer" may be defined with certain properties. A more specialized version of the "computer" type may be represented as a subtype of "computer" called "server computer". The subtype "server computer" will inherit all the properties of its parent type "computer". A subtype is also a type; consequently subtypes may themselves be parents of subtypes.

The term "enterprise architecture" is intended to mean the elements of an enterprise, the design of these elements, their relationships and how they support the objectives of that enterprise.

The term "attribution percentage" is intended to mean a percentage associated with a relationship that represents the percentage of the cost of an asset represented by one component to attribute to the cost of an asset represented by another component, wherein the relationship indicates a dependency between the two components.

Before discussing embodiments of the present invention, a non-limiting, simple IT environment used in depicting embodiments and examples is briefly described. After reading this specification, skilled artisans will appreciate that many other more complicated environments may be utilized with embodiments of the present invention.

FIG. 1 includes a diagram of a simple IT environment 100. IT environment 100 includes a server computer 110. Server computer 110 may comprise a central processing unit ("CPU"), a read-only memory ("ROM"), a random access memory ("RAM"), a hard drive ("HD") or storage memory, and I/Os. I/Os can include a keyboard, monitor, printer, electronic pointing device (e.g., mouse, trackball, stylus, etc.), or the like. Server computer 110 may also be executing an operating system as is commonly known in the art. Server computer 110 may have a set of attributes 112, such as the type of operating system executing on server computer 110, amount of RAM, amount of free storage space and the like.

IT environment 100 may further contain database server application 120 and web server application 130. Database server application 120 and web server application 130 may have certain attributes 122, 132 which pertain to their particular implementation. For example, each may utilize certain storage resources, have a certain filesystem structure, require a certain operating environment, and have a certain footprint. Other attributes will be readily apparent to those of ordinary skill in the art. Each of these software applications 120, 130 may be executing on server computer 110. Additionally each of the computers in FIG. 1 may have more than one CPU, ROM, RAM, HD, I/O, or other hardware components. Note that FIG. 1 is a simplification of an exemplary hardware configuration. Many other alternative hardware configurations are possible and known to skilled artisans.

Attention is now directed to methods and systems for calculating dependencies and costs of assets in an enterprise architecture which take into account the costs of the infrastructure and resources needed to support that asset. These systems and methods may utilize a reference model composed of a logically structured taxonomy of component types, relationship types and property types with which to create a data model. An enterprise architecture may then be modeled utilizing component types, components, relationship types, relationships and properties based on this reference data model. The data model of the enterprise architecture may then be used to create a dependency map for one or more of the components within the data model, taking into account the dependency chain of the component. Utilizing the costs of various components in this dependency chain, the cost of the original component may be calculated. Though various simple example environments will be used to demonstrate the power and flexibility of these systems and methods, after reading this disclosure it will be apparent to those of ordinary skill in the art that theses types of systems and methods for calculating the cost of components may be utilized with any arbitrarily complex enterprise architecture, and for that matter any arbitrarily complex real world system.

In an illustrative embodiment of the invention, the computer-executable instructions may be lines of assembly code or compiled $C^{++}$, Java, or other language code. Other architectures may be used. Additionally, a computer program or its software components with such code may be embodied in more than one data processing system readable medium in more than one computer.

Figure 2:
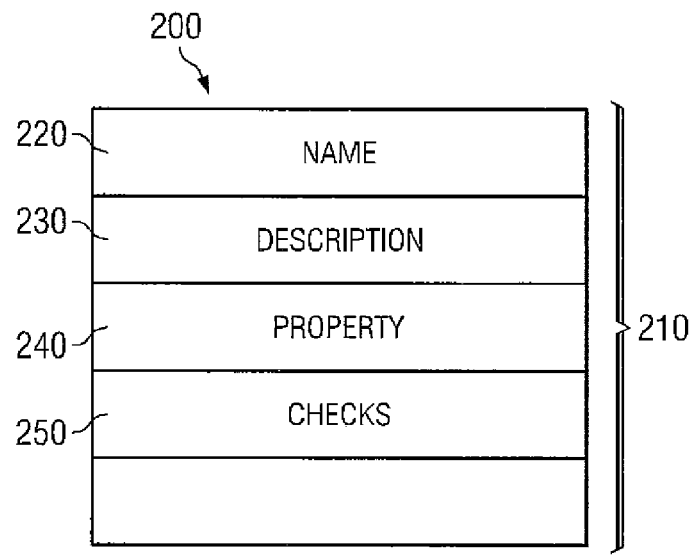
FIG. 2 includes a representation of a component.

Turning now to FIG. 2, a graphical representation of a component data structure is presented. Component 200 is a generic component which may be used to represent a logical or physical entity within an environment. Component 200 may have a set of fields 210 which contain information relating to the entity associated with component 200. Fields 210 may include a field for name 220, description 230, properties 240 and checks 250. Various other fields 210 may be included to further define component 200. Name field 220 may be used to particularly associate component 220 with a specific physical or logical entity. Description field 230 may further identify component 200, associate component 200 with a particular entity, or allow component 200 to be associated with a particular component type (as explained below).

Property field 240 may be used to represent the attributes or characteristics of the physical or logical entity represented by component 200, or with which component 200 is associated.

Property field 240 may be associated with one or more properties, a property may consist of a property name which may be associated with a value. This value in turn may correspond to an attribute of the physical or logical entity represented by component 200. A property may be a string, Boolean, decimal number, date/time, or an enumerated type, which describes the category of values a particular property may have. In one embodiment, a property may in turn be a data structure which has a name, a description, and a value. This data structure may then be given values based on an attribute of the entity represented by component 200.

Component 200 may also be related to a set of checks 250. A check may be a piece of logic which performs operations based on a certain set of conditions. These operations may consist of checking on the status of certain relationships associated with the component 200 (as described below), checking the status of certain properties 240, and other operations which will be readily apparent. These pieces of logic may be configured to operate automatically at certain time intervals, or may be applied at any point according to a variety of different triggering conditions which will be apparent to one of ordinary skill in the art after reading this disclosure.

Referring briefly back to FIG. 1, component 200 may be used to represent any object in IT environment 100. To represent server computer 110, name field 220 may be set to "server1", description 230 may be set to "server computer", property field 240 may contain three properties "OSType", "RAM", and "FreeStorage", which may be assigned the values corresponding to attributes 112 of server computer 110, "Solaris", "8 MB" and "6 MB" respectively.

Similarly, component 200 may represent database server 120; name field 220 may be set to "DB1", description 230 may be set to "database server application", property field 240 may contain three properties "OSType", "Footprint", and "Listen Port", which may be assigned the values corresponding to attributes 122 of database server 120, "Solaris", "12 MB" and "2100" respectively. As can be seen, component 200 may represent any entity, whether logical or physical equally well.

Figure 3:
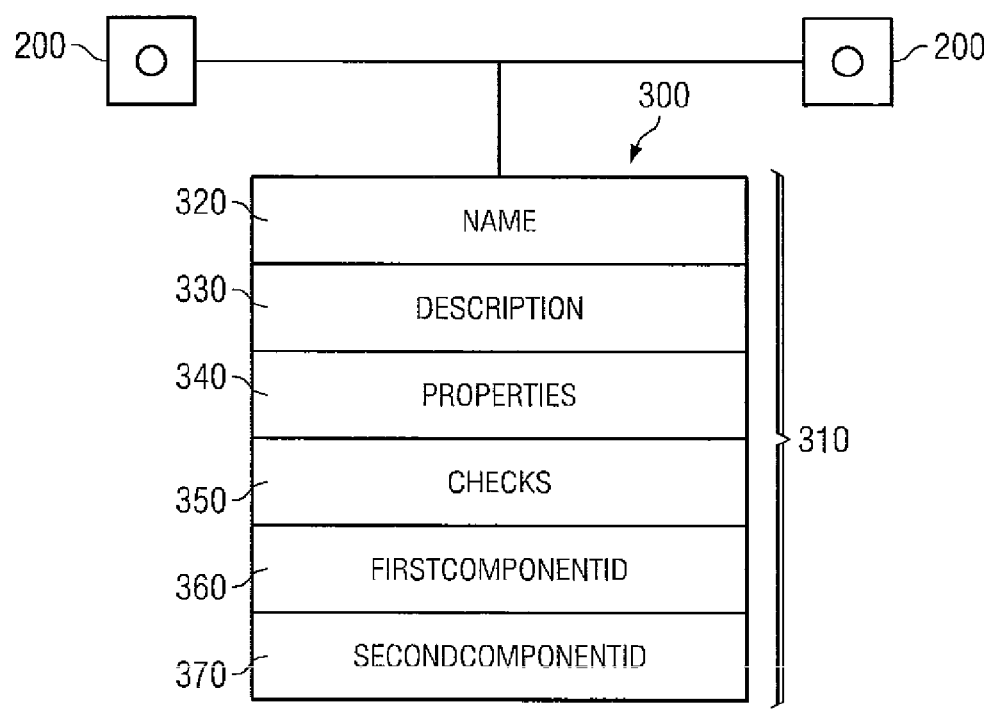
FIG. 3 includes a representation of a relationship.

Turning now to FIG. 3, a graphic representation of a relationship is depicted. Relationship 300 may be used to represent an association or dependency between two or more components 200. Relationship 300 may have a set of fields 310 which contain information pertinent to an association or dependency between two components. Fields 310 may include a field for name 320, description 330, property 340, and checks 350 as described above with respect to component 200. Name field 320 may be used to particularly associate relationship 300 with two or more physical or logical entities. In one embodiment, the name associated with name field 320 may be built programmatically based on the relationship type name and the names of the two components it is connecting. So, a "runs on" relationship type exists between components "app1" and "server1", the relationship name may be built automatically as "app1 runs on server1". That way, if either of the components' names changes, the relationship name may automatically changes to reflect this. Description field 330 may further distinguish relationship 300, associate relationship 300 with components, or allow relationship 300 to be associated with a particular relationship type (as explained below). Property field 340 may allow attributes of the relationships, dependencies between the relationships, or associations between the relationships, to be represented by a name and value pair. Checks 350 may contain one or more pieces of logic which perform operations based on certain set of conditions, as described above with respect to relationship 300. In a particular embodiment, fields 310 include fields 360, 370 to identify components 200 to which relationship 300 corresponds. Various other fields 310 may be included to further define relationship 300. In one embodiment, a relationship may have cardinality, such that a relationship may only represent an association or dependency between particular types or particular number of components. In other embodiments, a relationship may have directionality such that the relationship represents only that one component depends on another, and not vice versa. For example, a "runs on" relationship may have flags which can be used to indicate that a component "application1" runs on a component of type "server", but the component "server" does not run on the component "application1".

Returning for a moment to FIG. 1, relationship 300 may be used to represent any association between the logical or physical entities in IT environment 100. Component 200 may be used to represent database server 120 and server computer 110, as described above. Continuing with the above example, relationship 300 may be used to represent that database server 120 executes on server computer 110. Description 330 may be set to "runs on", property field 340 may contain a property "StartDate" which may be assigned the values corresponding to the date on which database server 120 began executing on server computer 110. To identify the components associated by relationship 300, FirstComponentID field 360 may be set to a name corresponding to server computer 110, in this example "server1"; likewise, SecondComponentID field 370 may be associated with component 200 representing database server 120. In one embodiment, row ids in a table are used to associate components with a relationship, thus, if a component is renamed relationships referencing this component do not have to be altered. As can be seen, relationship 300 may represent any association or dependency between any two or more logical or physical entities equally well.

However, as can be readily imagined, instantiation and definition of components and relationships for a complex environment may be a manually intensive process. To alleviate these concerns, in one embodiment, a typing system is included to allow the ability to define a hierarchy of component and relationship types which may serve as templates to instantiate components or relationships of these different types.

A hierarchy 400 of component types 410, 420, 430 is depicted in FIG. 4. Types 410, 420, 430 may provide different templates for instantiation of different components. Types, 420, 430 may have additional fields depending on the intended use of a component instantiated from the type. A component may be instantiated from a type and values assigned to the fields of the component based upon the physical or logical entity represented by the component.

Generic component type 410 may have a set of fields as described above. These fields may include a name and description 412, a set of properties 414, and a set of checks 416. A generic component may be instantiated from generic component type 410, and used to represent an atomic entity. For example, in order to represent server computer 110, a user may instantiate component 200 from generic component type 410, name component 200, define the list of properties pertinent to server computer 110, give these properties values based on the attributes of server computer 110, define checks pertinent to server computer 110, etc. In this manner, component 200 can be created which represents server 110 accurately. However, representing a complex environment in this manner becomes labor intensive, as a component to represent each atomic entity within the environment may have to be created manually.

To remedy this problem, more specific component types may be defined which serve as templates to instantiate components which represent specific entities in an environment. For example, a computer component type 420 may be defined to serve as a template for components which represent computers. This computer component type 420 may contain a name and description 422, properties 424 or checks 426 which are designed to represent a generic computer. A property within the set of properties 424 may contain a name and enumerated type corresponding to the values which that property may have. As expressed above, a property within the set of properties 424 may itself be a data structure; in this case a property may contain a name and a reference to a data structure. Examples of property names and their corresponding enumerated types are depicted in properties 424 of computer component type 420. Properties 424 and checks 426 will be common to all components instantiated from computer component type 420; in other words, all components instantiated from computer component type 420 will contain properties 424 and checks 426 of computer component type 420. This computer component type 420 may be used to instantiate component 200 to represent a computer in an environment, this component's 200 properties can then be assigned values based on the attributes of the computer which component 200 is intended to represent.

FIG. 5 is a depiction of component 500 which has been instantiated from computer component type 420 to represent server computer 110. Component 500 has fields 510 corresponding to the fields defined by computer component type 420, including properties 504 and checks 506 contained in the type definition of computer component type 420. The values 514 of properties 504 of component 500 may correspond to characteristics or attributes 112 of server computer 110. If server computer 110 has 8 megabytes of RAM, the property named "RAM" of component 500 may be set to 8. If the operating system implemented on web server is Solaris, the value of the "OSType" property in component 500 may be Solaris, etc. In this manner, component 500 models server computer 110 by representing attributes 112 of server computer 110 with the properties 504 of component 500.

Returning now to FIG. 4, in many cases computers in an environment may perform a specialized function, such as server computer 110. To represent these specialized machines, it may be desirable to have additional properties in the components representing these specialized machines which are not present in computer component type 420. This discrepancy may be remedied manually; a component of type "computer" may be instantiated from computer component type 420 to represent server computer 110, and any specialized properties desired, but not contained, in this component may be added. Again, however, this process quickly becomes manually intensive when many specialized machines are present.

In some embodiments, a component subtype may be defined with respect to a parent component type. This component subtype represents a specialized subgroup of the respective parent component type. A component instantiated from a component subtype may inherit all the properties and checks corresponding to its respective parent component type. Consequently, when component 200 is instantiated from a component subtype, component 200 contains all the properties and checks contained in the definition of the component subtype plus all the properties and checks contained in the definition of the parent component type.

For example, computer component type 420 may be defined to serve as a template for components which represent computers. This computer component type 420 will contain checks 426 or properties 424 which correspond to a generic computer, and will be common to all components instantiated from computer type 420. A server computer component subtype 430 may be defined with respect to parent computer component type 420. This definition may include only a name and description 432, properties 434 and checks 436 specific to server computer component subtype 430. Consequently, when a component is instantiated from server computer component subtype 430 this component will contain all the properties 424, 434 and checks 426, 436 contained in both the parent computer component type 420 and the server computer component subtype 430. For example, if component 200 were instantiated from server computer component subtype 430, component 200 would contain the properties named "OSType", "RAM", and "CPU" contained in parent computer component type 420, and the property "FreeStorage" contained in server computer component subtype 430. These properties may then be assigned values.

It will be apparent to those of ordinary skill in the art the recursive nature of this type/subtype correlation and the inheritance characteristics that accompany these correlations. For example, a subtype may be the parent type of a second subtype. In addition to containing the checks and properties defined in the second subtype, a component instantiated from the second subtype will contain the checks and properties defined in both the first subtype and the original parent. The power and flexibility of such a system will also be apparent, a component hierarchy specifically tailored to any environment can be defined from a generic component type.

As described above, relationships are used in tandem with components to model arbitrary systems and environments by representing an association or dependencies between two components. As will be readily apparent, the same reasoning that applies to components with respect to a hierarchy of types may be applied equally well to relationships. Manual instantiation of relationships may be time consuming if the representation of many dependencies or associations is necessary. Consequently, types and subtypes corresponding to a particular category of these dependencies or associations may also be defined for relationships, and relationships instantiated from these defined types and subtypes. Each relationship type may also have cardinality, such that a relationship instantiated from this relationship type may only represent an association or dependency between two particular component types or subtypes. For example, a "runs on" relationship type may be defined to exist between one component of type "application" and one component of type "server". Additionally, as mentioned above a relationship type may have flags which can be used to indicate directionality, such that a relationship instantiated from this relationship type may only represent that one component depends on another component in some manner, but not the opposite. It will be noted that all principles described with respect to types and subtypes in the context of components are equally applicable to relationships, including the principle of inheritance.

Moving on to FIG. 6, a representation 600 of using components and relationships to model a portion of IT environment in FIG. 1 is depicted. Component 610 represents the physical entity server computer 110 and has properties with values corresponding to attributes 112 of server computer 110. Components 620 and 630 represent logical entities database server 120 and web server 130 respectively. Properties of components 620, 630 may have values corresponding with attributes 122, 132 of database server 120 and web server 130.

Database server 120 executes on server computer 110. To represent this association, relationship 640 may be named "runs on", FirstComponentID field 360 of relationship 640 may be linked to component 620 representing database server 120, while SecondComponentID 370 may be linked with component 610 corresponding to server computer 110, and properties of relationship 640 may be defined accordingly. In this manner, the fact that database server 120 executes on server computer 110 may be modeled by relationship 640. Likewise, the fact that web server 130 also executes on server computer 110 may also be modeled. Relationship 650, also of type "runs on", may be instantiated, given properties, and associated with components 610, 630 representing web server 130 and server computer 110 using FirstComponentID field 360 and SecondComponentID field 370. This type of data model allows changes to an environment to be accommodated with a minimum of disturbance to the model of that environment. In particular embodiments, a blueprint may be used to contain the entire representation 600 of the IT environment.

Figure 7:
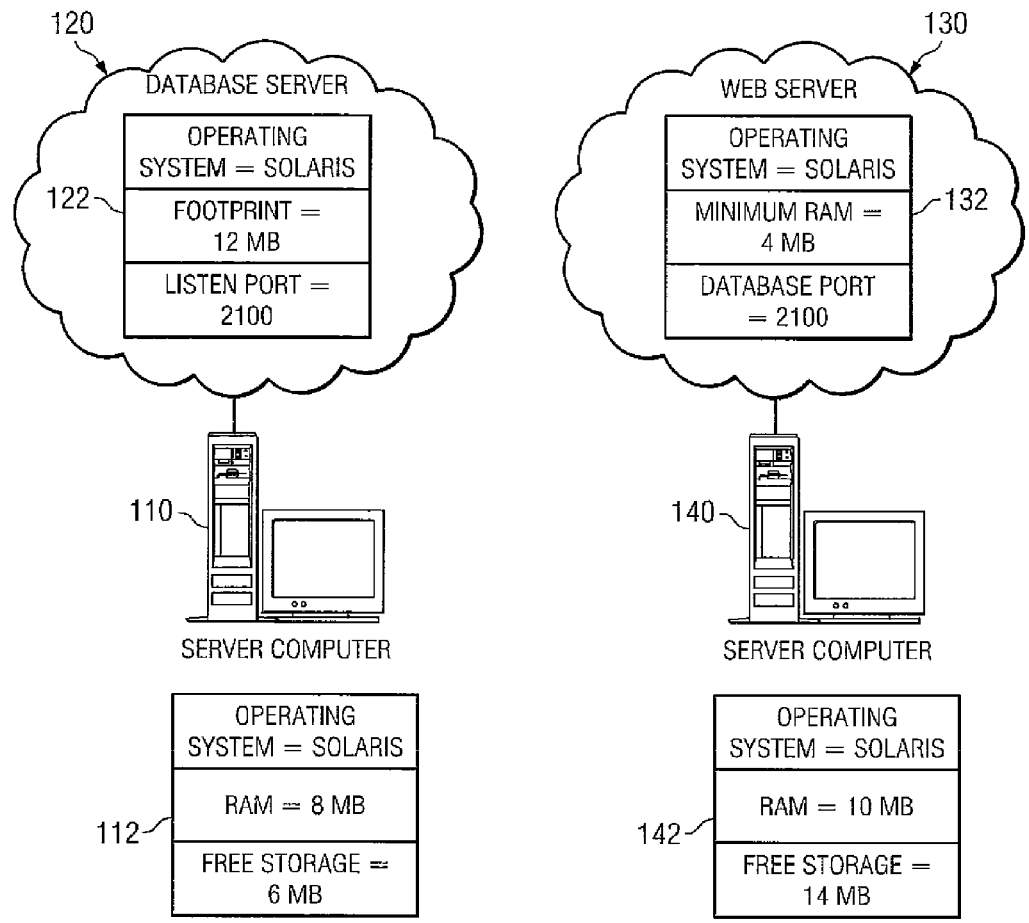
FIG. 7 includes an illustration of an alteration to the IT environment of FIG. 1.

Suppose that the IT environment depicted in FIG. 1 is altered to the IT environment depicted in FIG. 7. IT environment 100 now includes second server computer 140, with web server 130 executing on second server computer 140. Server computer 110, database server 120, and web server 130 remain unaltered, with exactly the same attributes 112, 122, 132. To represent the IT environment in FIG. 7 minimal changes to the model represented in FIG. 6 are necessary.

FIG. 8 is a representation 800 of an application of embodiments of the data model to the IT environment depicted in FIG. 7. Component 810, representing second server computer 140, has been added to the model. Properties of component 810 have values corresponding to attributes 142 of second server computer 140. Components 610, 620, 630 remain unaltered, as the entities which they represent remain unchanged. Relationship 640 also remains unaltered, as database server 120 still executes on server computer 110. Relationship 650, representing the association between web server 130 and the entity on which web server 130 executes, must be altered to accurately represent that web server 130 now executes on second server computer 140. This alteration may be accomplished simply by changing SecondComponentID field 370 of relationship 650 to an association with component 810 representing server computer 140. Relationship 650 now accurately depicts the association between web server 130 and second server computer 140. As can be seen, changes to a particular environment can be easily accommodated by the data model with a minimum of change to the actual data structures which represent the environment.

Often times after a particular enterprise architecture is modeled using components and relationships, the resulting data model is applied to the management and analysis of the enterprise architecture. One particularly useful application of the data model is the calculation of the costs of various assets that comprise the enterprise architecture, where the calculation of the cost of any particular asset takes into account not only the direct dependencies and costs of that particular asset, but the indirect dependencies and costs of that asset as well. Using the data model of the enterprise architecture, the dependency chains for one or more components of the data model can be discovered and a dependency map created. Using the costs associated with the components in the dependency chains of a particular component, the cost of that particular component can be calculated.

Figure 9:
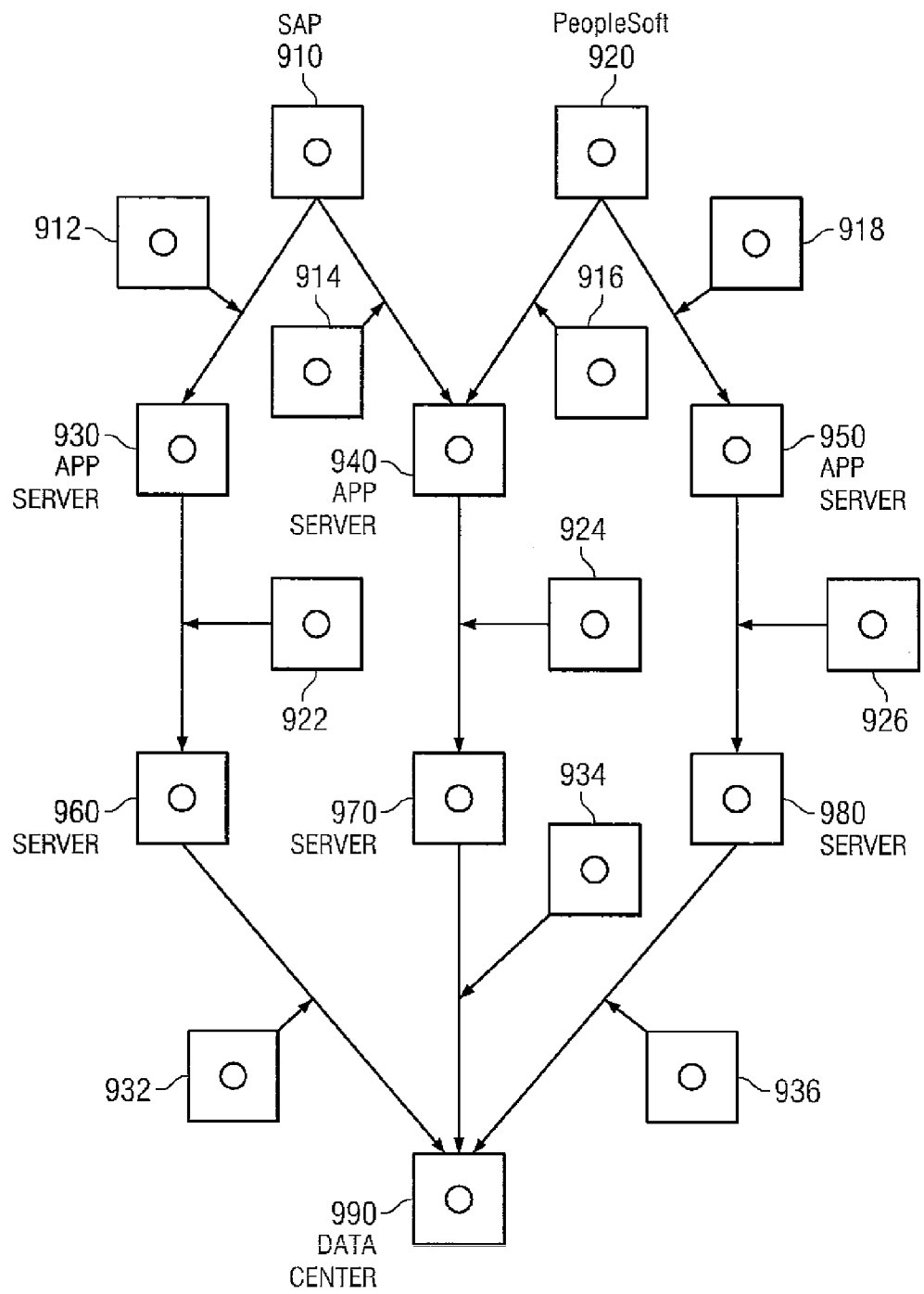
FIG. 9 includes a representation of a data model for an example enterprise architecture.

Another example may be helpful in describing the systems and methods of the present invention used to calculate the cost of an asset within an enterprise architecture. Turning to FIG. 9, a representation 900 of an exemplary data model of an enterprise architecture which will be used in conjunction with various descriptions of the embodiments of the invention is depicted. Components 910 and 920 represent an SAP and a PeopleSoft database respectively. Components 930, 940 and 950 represent application server applications, components 960, 970 and 980 represent hardware servers and component 990 represents the physical location of a data center. Relationships 912-918 are directional "runs on" relationships (the direction of which is indicated by the arrow). Relationship 912 represents that the SAP database represented by component 910 executes on the application server represented by component 930. Similarly, relationship 914 represents that the SAP database represented by component 910 executes on the application server represented by component 940, relationship 916 represents that the PeopleSoft database represented by component 920 executes on the application server represented by component 940, and relationship 918 represents that the PeopleSoft database represented by component 920 executes on the application server represented by component 950.

Relationships 922-926 are also directional "runs on" relationships. Relationship 922 represents that the application server represented by component 930 executes on the hardware server represented by component 960. Similarly, relationship 924 represents that the application server represented by component 940 executes on the hardware server represented by component 970 and relationship 926 represents that the application server represented by component 950 executes on the hardware server represented by component 980.

Relationships 932-936 may be directional "located in" relationships, such that relationship 932 represents that the hardware server represented by component 960 is located in the data center represented by component 990; relationship 934 represents that the hardware server represented by component 970 is located in the data center represented by component 990 and relationship 936 represents that the hardware server represented by component 980 is located in the data center represented by component 990.

As can be seen from representation 900, the cost of most assets corresponding to components in a data model depends not only on the direct cost of the asset represented by that component, but also includes at least a portion of the cost of the other assets on which it depends. For example, the total cost of the SAP database represented by component 910 may encompass: the direct cost of the SAP database represented by component 910 and some part of the total cost of the application servers represented by components 930 and 940. The costs of the application server represented by component 930 in turn includes the direct cost of the application server represented by component 930 and some part of the cost of the server represented by component 960. The costs of the application server represented by component 940 in turn includes the direct cost of the application server represented by component 940 and some part of the cost of the server represented by component 970. The cost of the servers represented by components 960 and 970, likewise includes the direct cost of these servers, and some portion of the cost of the data center represented by component 990. Thus, the total cost of the SAP data base represented by component 910, includes some portion of the cost of the application servers represented by components 930 and 940, some portion of the cost of the hardware servers represented by components 960 and 970, and some portion of the cost of the datacenter represented by component 990.

As can be imagined, the more complex the data model the more complicated it becomes to determine the dependencies of a component in the data model and commensurately the more complicated it becomes to calculate an accurate cost for an asset in an enterprise architecture represented by a component in the data model. What is desired is a methodology for utilizing a data model to calculate the cost for an asset of an enterprise architecture, where the asset is represented as a component in the data model.

Figure 10:
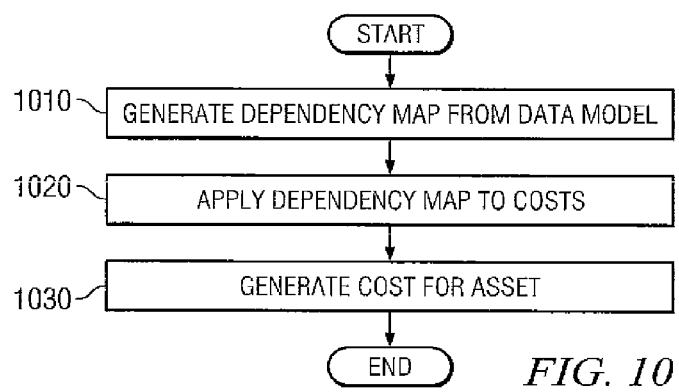
FIG. 10 includes a flow diagram for one embodiment of determining the cost of an asset.

FIG. 10 presents one embodiment of just such a methodology.

First, at step 1010, a dependency map may be generated from the data model. This dependency map may then be applied, at step 1020, to a cost structure to generate a cost for a particular component of the data model at step 1030.

In one embodiment, to create a dependency map (step 1010) the data model may be analyzed to generate a set of first level dependencies for each component in a data model. To determine these first level dependencies for a component each relationship associated with the component is evaluated to determine if the relationship indicates dependency on another component by analyzing the directionality of the relationship. If the relationship indicates that the component is dependent on another component, the relationship may be further analyzed to see if it is a cost conferring relationship. This analysis may be accomplished by comparing the relationship against a set of relationships which have been designated as cost conferring relationships. If the relationship is a cost conferring relationship indicating dependency on another component this dependency may be indicated in the set of first level dependencies for that component.

Again it is helpful to utilize the exemplary data model presented in FIG. 9 for illustration. For example, to determine the first level dependencies of component 910 each of relationships 912 and 914 is evaluated to determine if these relationships 912, 914 indicate that component 910 is dependent on other components, and whether these are cost conferring relationships. In this case, as relationships 912 and 914 are both directional "runs on" relationships it will be indicated that the first level dependencies of component 910 are components 930 and 940.

In one embodiment, the evaluation of a data model to determine first level dependencies results in a set of tables, with the tables indicating the first level dependencies of some set or subset of the components in the data model. FIG. 11 depicts an example of a set of tables indicating the first level dependencies of each component in the data model of FIG. 9. More specifically, table 1110 indicates the first level dependencies of component 910; table 1120 indicates the first level dependencies of component 920; table 1130 indicates the first level dependencies of component 930; table 1140 indicates the first level dependencies of component 940; etc.

Based on these first level dependencies, the total cost of a component can be apportioned among the components that depend on that component. To apportion the total cost of a component, each relationship associated with that component may be evaluated to determine if the relationship indicates that another components is dependent on the component by analyzing the directionality of the relationship. If the relationship indicates that another component is dependent on the component, the relationship may be further analyzed to see if it is a cost conferring relationship.

In one embodiment, the cost of a component is apportioned evenly between all relationships that indicate dependency on that component and are cost conferring. To relate this once again to the example of FIG. 9, suppose we are apportioning the cost of the application server represented by component 940. Here, each of relationships 914 and 916 is evaluated to determine if these relationships 914, 916 indicate that other components are dependent on component 940, and whether these are cost conferring relationships. In this case, as relationships 914 and 916 are both directional "runs on" relationships both of these relationships 914, 916 fulfill that criteria, and the cost of component 940 may be apportioned evenly between relationships 914, 916. In this manner, cost apportionments may be associated with cost conferring relationships in a data model.

Figure 12:
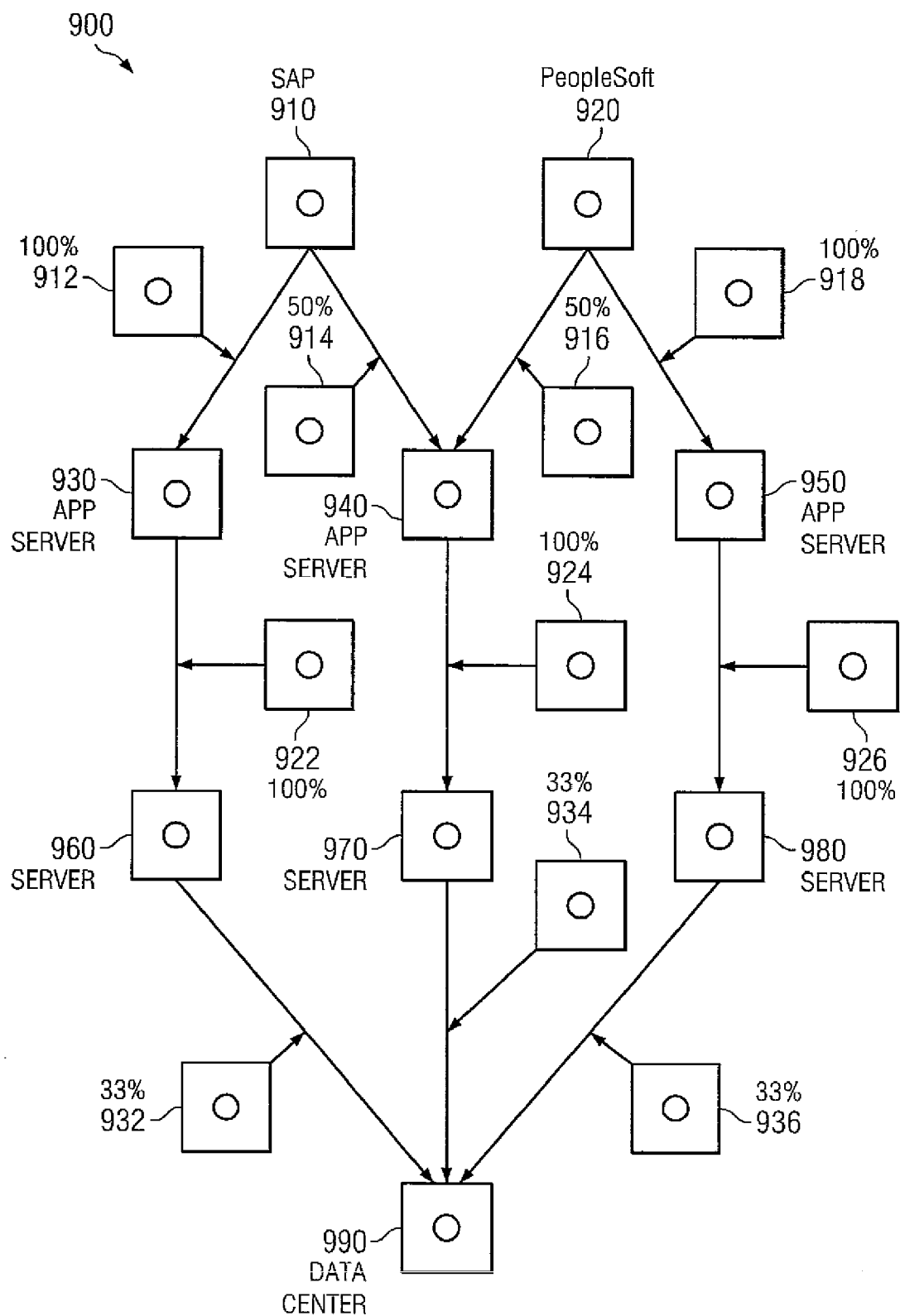
FIG. 12 includes a representation of a data model for an example enterprise architecture.

FIG. 12 depicts a representation of the above methodology applied to the data model of FIG. 9. Notice that each relationship 912, 914, 916, 918, 922, 924, 926, 932, 934 and 936 has a percentage associated with it. This percentage, which may be called an attribution percentage, indicates the proportion of the cost of a component which should be attributed to another component when calculating the cost of the other component. For example, the percentage associated with relationship 934 indicates that 33% of the cost of the data center represented by component 990 should be attributed to the server represented by component 970.

In another embodiment, the percentage cost of one component which should be attributed to another component may be assigned or associated with a relationship at an earlier point, such as when the relationship is instantiated. These percentages may then be used instead of proportioning the cost of a component equally between relationships associated with the component. This approach may be problematic, however, as enterprise architectures tend to be fluid entities. Thus, the data models that represent these enterprise architectures tend to be fluid as well. Occasionally, as a result of these changes the percentages originally associated with relationships may not account for 100% of the cost of a component. In this case, the percentages assigned to the relationships for a various component may still be used to apportion the full cost of that component, however, these percentages will be scaled to account for the full cost of the component.

To illustrate, suppose relationship 914 indicates that 30% of the cost of the server represented by component 940 should be apportioned to component 910, while relationship 916 indicates that 20% of the cost of the server represented by component 940 should be apportioned to component 920. To utilize the same relative apportionment of the cost of the server represented by component 940 while still proportioning the full cost of the server, these percentages may be scaled to account for 100% of the cost. As a result, the percentage associated with relationship 914 may be scaled up to 60% and the percentage associated with relationship 916 may be scaled up to 40%. As can be imagined, the same process may be applied to scale down percentages that account for greater than 100% of the cost of an asset.

After the first level dependencies for the components of a data model are determined, and the cost of components apportioned, the deeper dependencies of the component in the data model may be determined. Returning to FIG. 11, tables 1110-1190 of first level dependencies may be used to determine all the dependencies either direct or indirect for one or more of the components in the data model. In one particular embodiment, the determination of these dependencies may be determined by running a graph traversal algorithm on the data model, or alternatively, on tables 1110-1190 representing the first level dependencies of components in the data model to create a dependency map for the component or the graph traversal algorithm may determine all the dependencies of one or more components. An example of such a graph traversal algorithm is depicted in Appendix A.

In addition to determining dependencies for a component, the graph traversal algorithm may also determine the proportion of the cost of each various components on which a component is dependent that should be apportioned to the component based on the data model.

The graph traversal algorithm may start at a component for which it is desired to determine the cost. It can then find each component on which the component depends in the first degree by following the relationships associated with the component, and calculate the percentage cost that should be apportioned from each of those first degree components to the component. From these first degree components, components on which the component depend in the second degree may be found by following the relationships from each of the first degree components to the second degree components, and the percentage cost that should be apportioned from each of these second degree components to the component calculated. This percentage may be calculated for a second degree component by multiplying the percentage associated with the relationship linking the second degree component to a first degree component with the percentage linking the first degree component with the component itself. This graph traversal mechanism may similarly continue until every component on which the original component depends is found, and the percentage of the cost of every component on which the component depends to apportion to the original component is determined.

Referring to FIG. 12, suppose that it is desired to calculate the cost of SAP database represented by component 910. The graph traversal algorithm may start at component 910 and determine that component 910 is dependent on components 930 and 940, additionally the graph traversal algorithm may determine that 100% of the cost of component 930 should be apportioned to component 910, while 50% of the cost of component 940 should be apportioned to component 910. The graph traversal algorithm may then find the second degree dependencies of component 910 by finding the dependencies of component 930 and 940. The graph traversal algorithm finds that component 930 depends on component 960. Thus, component 910 depends on component 960 in the second degree. By multiplying the percentage associated with relationship 912 and relationship 922, it can be determined that 100% of the cost of component 960 should be apportioned to component 910. Similarly, the graph traversal algorithm may find that component 940 depends on component 970. Thus, component 910 depends on component 970 in the second degree. By multiplying the percentage associated with relationship 914 and relationship 924, it can be determined that 50% of the cost of component 960 should be apportioned to component 910.

The graph traversal algorithm may then find the third degree dependencies of component 910 by finding the dependencies of component 960 and 970. The graph traversal algorithm finds that component 960 depends on component 990. Thus, component 910 depends on component 990 in the third degree. By multiplying the percentage associated with relationships 912, 922 and 932 it can be determined that 33% of the cost of component 990 should be apportioned to component 910. Additionally, the graph traversal algorithm may find that component 970 depends on component 990. Thus, component 910 depends on component 990 in the third degree. By multiplying the percentage associated with relationships 914, 924 and 934 it can be determined that 16.5% of the cost of component 990 should be apportioned to component 910. The graph traversal algorithm may attempt to find the fourth degree dependencies by finding the dependencies of component 990, however, upon finding that component 990 has no dependencies the graph traversal algorithm may cease.

Moving to FIG. 13, a representation of the dependency map determined by the graph traversal mechanism applied with respect to the data model of representation 900 and the percentages of the example depicted in FIG. 12 is illustrated. Each entry in table 1300 illustrates each of the independent cost chains originating with component 910, and the percentage of the cost of the last component in the chain that should be attributed to component 910 when calculating the cost of the asset represented by component 910, also known as the attributable cost. For example, row 1310 indicates that 16.5% of the cost of the asset represented by component 990 (a data center) should be apportioned to the asset represented by component 910 (SAP database) when calculating the cost of the asset represented by component 910.

As mentioned above, modern enterprise architectures are complex systems. In fact, many assets of an enterprise architecture may be mutually dependent on one another. This may result in the data model representing an enterprise architecture of this type having a cycle.

Figure 14:
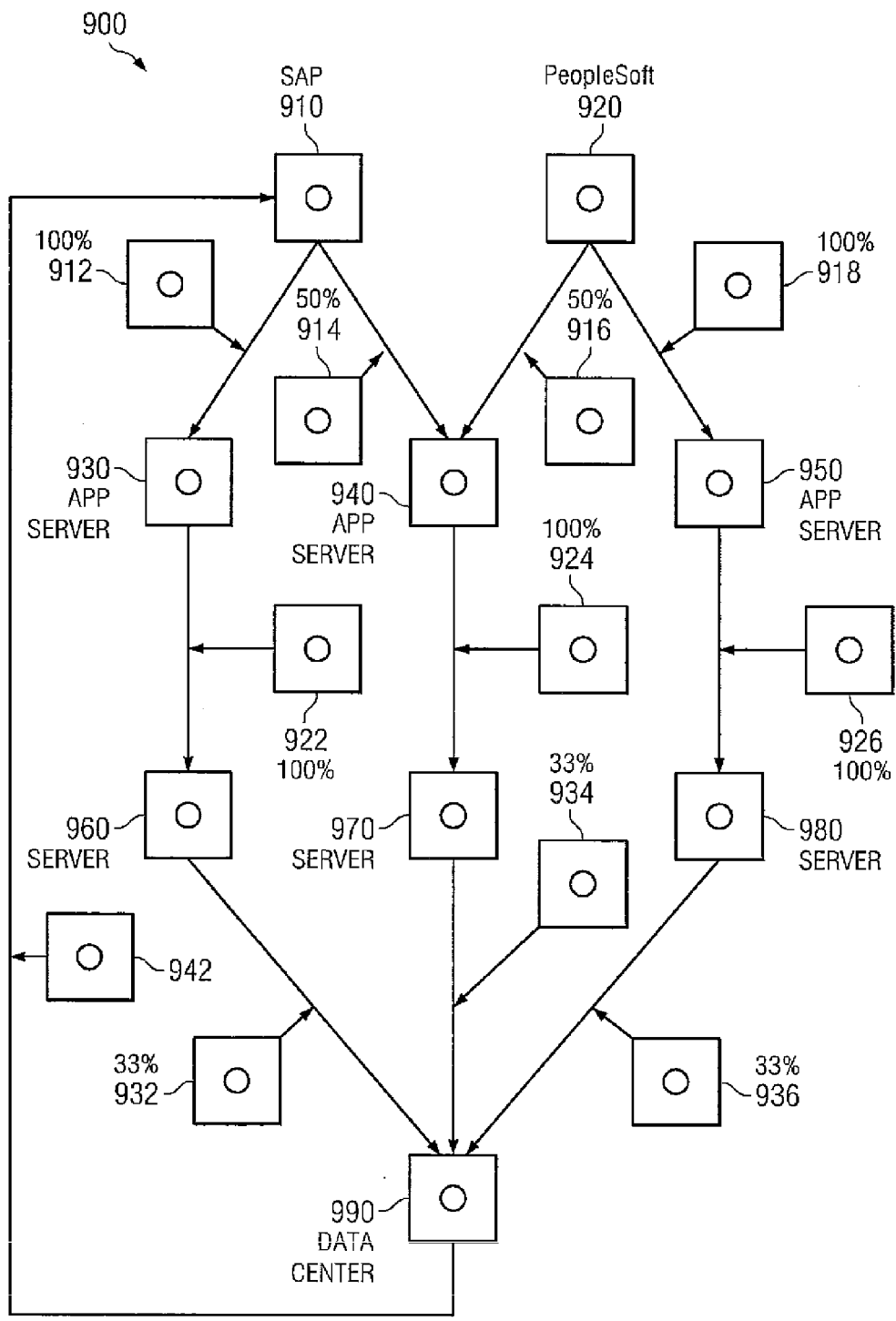
FIG. 14 includes a representation of a data model for an example enterprise architecture.

For example, turning to FIG. 14, suppose now that data center represented by component 990 utilizes the SAP data base represented by component 910, as indicated by relationship 942. When executing the graph traversal algorithm described above on the data model depicted in representation 1400 in to compute the cost of component 910, relationship 942 may create a cycle such that the graph traversal algorithm may enter a loop, or may apportion the cost of various components more than once. In order to avoid these cycles and the potential loops or multiple counting of costs that these cycles may entail, in one embodiment the graph traversal algorithm may maintain a record of the components which have been visited during a traversal from a component, such that if a component is reached twice this may be accounted for, for example by ignoring that particular dependency chain.

Returning again to FIG. 10, once a dependency map has been generated for a particular component, at step 1010, this dependency map may be applied to the costs of the assets in the enterprise architecture at step 1020 to generate the cost for the asset represented by the component at step 1030. In one embodiment, the costs for the assets for a particular enterprise architecture may be stored in a separate cost model.

FIG. 15 illustrates one embodiment of a cost model for the enterprise architecture represented by the data model of FIG. 9. Table 1500 contains each asset, the cost of each asset and the component representing each asset. It will be understood that these costs may be determined by a variety of means, such as empirical evidence, cost projections or estimates, actual cost for hardware etc., and that theses costs may be updated on a variety of time tables, and may refer to periodic costs, fixed costs etc. The costs in table 1500 may be applied to a dependency map generated from a data model to generate the cost for a particular asset.

FIG. 16 represents the results of the application of the cost model of table 1500 to the dependency map for component 910, an embodiment of which is depicted in FIG. 13. For each dependency chain 1610, the percentage of the cost of the asset represented by the last component in the dependency chain is multiplied by the cost of the asset represented by the last component. These attributable costs 1620 can then be summed to generate a total cost attributable to the asset represented by component 910. This total attributable cost can then be summed with the cost of the asset represented by component 910, to generate a cost for the asset represented by component 910.

Note that not all of the domains, components, component types, relationships, relationship types, properties, or property types are necessary, that domains, components, component types, relationships, relationship types, properties, or property types may be added in addition to those illustrated. Additionally, the order in which each of the activities is listed is not necessarily the order in which they are performed. After reading this specification, a person of ordinary skill in the art will be capable of determining which domains, components, component types, relationships, relationship types, properties, or property types and orderings best suit any particular objective. For example, domains such as time and finance may be added to the domains described above.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

APPENDIX

This appendix presents one embodiment of a graph traversal algorithm for determining the dependencies of a component. In this particular embodiment, for each component in the system, every other component that directly depends on it is analyzed. Based on a set system of hierarchies of preference, the percentage of dependency of each component can be determined. If a single component is dependent on another component, this percentage will be 100%. However, if there are more than one dependent components, the rules must be used to determine which component gets assigned which percentage. These direct dependency relationships are known here as level-1 consumption relationships.

For each level-1 consumption relationship, we begin a recursive process of examining the components. By multiplying the percentage in the original level-1 relationship against the percentage of the next level-1 consumption relationship, we yield a level-2 consumption relationship. As we parse down the data model increasing the length of this level-n relationship, cyclical relationships will be taken into account. If at any point we return to a component that is already in the current branch that we are following, we have come upon a cycle and we can immediately stop processing this branch. For purposes of this algorithm it will be understood that the term consumer indicates a component representing an asset dependent on another asset represented by a producer component.

01 For prod in Consumed Components
02 For cons in Components that Consume prod
03 Create level-1 consumption relationship
04 End
05 End
06
07 For rel1 in level-1 Consumption Relationships
08 Process rel1.consumer, rel1.producer, rel1.percentage, rel1.consumer+rel1.producer
09 End
10
11 Function Process (consumer, producer, percentage, branches)
12 For rel2 in level-1 consumption relationships where producer=rel2.consumer
13 If branches does not contain rel2.producer
14 Create new level-2 consumption relationship (consumer, rel2.producer, percentage*rel2.percentage)
15 Process consumer, rel2.producer, percentage*rel2.percentage, branches+rel2.producer
16 End
17 End
18 End
01 Find each component in the system that is ever consumed by another component
02 Find each of the component that consume the first component
03 Create a level-1 relationship in the data warehouse describing the fact that the consumer consumes the producer along with the percentage of the producer that is consumed by that specific consumer
07 Find each level-1 consumption relationship in the data warehouse
08 For each level-1 relationship, call the Process method with the consumer, the producer, the percentage of the producer being consumed by the consumer and a breadcrumb structure containing the producer and consumer
12 Find each level-1 consumption relationship in the data warehouse where the consumer in that level-1 relationship is the same as the consumer in the call to the process method
13 If the branches object (which contains all of the components we have already seen) does not contain the producer in the new level-1 relationship
14 Create a new level-2 consumption relationship using the original consumer in the call to Process, the producer from the new level-1 relationship and the original percentage in the call to Process*the percentage of the new level-1 relationship
15 Call the Process method recursively using the original consumer component, the producer from the new level-1 relationship, the original percentage*the percentage from the new level-1 relationship and the original branches object with the addition of the producer from the new level-1 relationship.

What is claimed is:

1. A method for determining the cost of an asset in an environment, where the environment is modeled using a data model comprising a set of components and relationships representing logical or physical entities in an environment and the relationships between these entities, wherein each of the components and relationships in the data model has a type and a set of properties wherein each of the values for the type and set of properties of each of the components and relationships in the data model are based on the entities in the environment, each relationship represents a directional dependency associated with a first component and a second component and the data model is stored using a table schema comprising a component table for storing each component and a relationship table for storing each relationship, comprising:

I. identifying an entity in the environment for which a cost is to be determined;
II. calculating, by a computing device, the cost for the entity using a first component of the data model representing the entity, where calculating the cost for the entity comprises:
A. determining a set of dependency chains that begin with the first component and end with a last component, wherein each dependency chain is different and comprises a set of components including the first component and the last component and a set of relationships between those components, wherein determining the set of dependency chains comprises:
i. determining one or more relationships associated with the first component, and for each of the relationships:
a. analyzing the relationship based on the type and directional dependency of the relationship to determine if the relationship is a cost-conferring relationship, and
b. when the relationship is determined to be cost-conferring, adding the relationship and a second component associated with the relationship to the dependency chain, and
c. determining if the dependency chain is in the set of dependency chains and, if not, adding the dependency chain to the set of dependency chains where the second component is the last component of the newly added dependency chain, and
d. determining if the second component is the last component, if not, repeating the analyzing, adding and determining steps until the second component is the last component;
III. calculating a cost for each of the dependency chains, wherein calculating a cost for a dependency chains comprises:
A. determining a cost associated with each of the components in the dependency chain,
B. determining an attribution percentage associated with each of the set of relationships of the dependency chain based on the type of each relationship, wherein the attribution percentage is equal to or less than 100%, and C. multiplying the attribution percentages for each of the set of relationships and the cost of the last component of the dependency chain; and IV. summing the costs for each of the dependency chains.

2. The method of claim 1, wherein determining the set of dependency chains comprises eliminating a dependency chain if the set of components of the dependency chain includes two or more of the same component.

3. The method of claim 1, wherein determining the set of dependency chains utilizes a graph traversal algorithm.

4. The method of claim 1, wherein the attribution percentages are scaled.

5. The method of claim 1, wherein each cost is stored in a cost model.

6. The method of claim 1, wherein the attribution percentages associated with each of the set of relationships sum to 100%.

7. The method of claim 1, wherein the data model represents an enterprise architecture.

8. A system for determining the cost of an asset in an environment, comprising:

a modeling computer configured to model an environment using a data model comprising a set of components and relationships representing logical or physical entities in an environment and the relationships between these entities, wherein each of the components and relationships in the data model has a type and a set of properties wherein each of the values for the type and set of properties of each of the components and relationships in the data model are based on the entities in the environment, each relationship represents a directional dependency associated with a first component and a second component and the data model is stored using a table schema comprising a component table for storing each component and a relationship table for storing each relationship, by:

I. identifying an entity in the environment for which a cost is to be determined;

II. calculating, by a computing device, the cost for the entity using a first component of the data model representing the entity, where calculating the cost for the entity comprises:

A. determining a set of dependency chains that begin with the first component and end with a last component, wherein each dependency chain is different and comprises a set of components including the first component and the last component and a set of relationships between those components, wherein determining the set of dependency chains comprises:

i. determining one or more relationships associated with the first component, and for each of the relationships:

a. analyzing the relationship based on the type and directional dependency of the relationship to determine if the relationship is a cost-conferring relationship, and b. when the relationship is determined to be cost-conferring, adding the relationship and a second component associated with the relationship to the dependency chain, and c. determining if the dependency chain is in the set of dependency chains and, if not, adding the dependency chain to the set of dependency chains where the second component is the last component of the newly added dependency chain, and d. determining if the second component is the last component, if not, repeating the analyzing, adding and determining steps until the second component is the last component;

III. calculating a cost for each of the dependency chains, wherein calculating a cost for a dependency chains comprises:

A. determining a cost associated with each of the components in the dependency chain, B. determining an attribution percentage associated with each of the set of relationships of the dependency chain based on the type of each relationship, wherein the attribution percentage is equal to or less than 100%, and C. multiplying the attribution percentages for each of the set of relationships and the cost of the last component of the dependency chain; and IV. summing the costs for each of the dependency chains.

9. The system of claim 8, wherein determining the set of dependency chains comprises eliminating a dependency chain if the set of components of the dependency chain includes two or more of the same component.

10. The system of claim 8, wherein determining the set of dependency chains utilizes a graph traversal algorithm.

11. The system of claim 8, wherein the attribution percentages are scaled.

12. The system of claim 8, wherein each cost is stored in a cost model.

13. The system of claim 8, Wherein the attribution percentages associated with each of the set of relationships sum to 100%.

14. The system of claim 8, wherein the data model represents an enterprise architecture.

15. A non-transitory computer readable medium comprising instructions for determining the cost of an asset in an environment, where the environment is modeled using a data model comprising a set of components and relationships representing logical or physical entities in an environment and the relationships between these entities, wherein each of the components and relationships in the data model has a type and a set of properties wherein each of the values for the type and set of properties of each of the components and relationships in the data model are based on the entities in the environment, each relationship represents a directional dependency associated with a first component and a second component and the data model is stored using a table schema comprising a component table for storing each component and a relationship table for storing each relationship, by:

I. identifying an entity in the environment for which a cost is to be determined;

II. calculating, by a computing device, the cost for the entity using a first component of the data model representing the entity, where calculating the cost for the entity comprises:

A. determining a set of dependency chains that begin with the first component and end with a last component, wherein each dependency chain is different and comprises a set of components including the first component and the last component and a set of relationships between those components, wherein determining the set of dependency chains comprises:

i. determining one or more relationships associated with the first component, and for each of the relationships:
   a. analyzing the relationship based on the type and directional dependency of the relationship to determine if the relationship is a cost-conferring relationship, and
   b. when the relationship is determined to be cost-conferring, adding the relationship and a second component associated with the relationship to the dependency chain, and
   c. determining if the dependency chain is in the set of dependency chains and, if not, adding the dependency chain to the set of dependency chains where the second component is the last component of the newly added dependency chain, and
   d. determining if the second component is the last component, if not, repeating the analyzing, adding and determining steps until the second component is the last component;

III. calculating a cost for each of the dependency chains, wherein calculating a cost for a dependency chains comprises:
   A. determining a cost associated with each of the components in the dependency chain,
   B. determining an attribution percentage associated with each of the set of relationships of the dependency chain based on the type of each relationship, wherein the attribution percentage is equal to or less than 100%, and
   C. multiplying the attribution percentages for each of the set of relationships and the cost of the last component of the dependency chain; and IV. summing the costs for each of the dependency chains.

16. The computer readable medium of claim 15, wherein determining the set of dependency chains comprises eliminating a dependency chain if the set of components of the dependency chain includes two or more of the same component.

17. The computer readable medium of claim 15, wherein determining the set of dependency chains utilizes a graph traversal algorithm.

18. The computer readable medium of claim 15, wherein the attribution percentages are scaled.

19. The computer readable medium of claim 15, wherein each cost is stored in a cost model.

20. The computer readable medium of claim 15, wherein the attribution percentages associated with each of the set of relationships sum to 100%.

21. The computer readable medium of claim 15, wherein the data model represents an enterprise architecture.

* * * * *